Aug. 21, 1928. 1,681,440
A. G. SHERMAN ET AL
PROCESS FOR CONTINUOUS GLASS ENAMELING
Filed May 21, 1925 11 Sheets-Sheet 2

Aug. 21, 1928.  
A. G. SHERMAN ET AL  
1,681,440  
PROCESS FOR CONTINUOUS GLASS ENAMELING  
Filed May 21, 1925 — 11 Sheets-Sheet 5

Inventors  
Alvin G. Sherman  
Albert Meadows.  
By Stuart C. Barnes  
Attorney

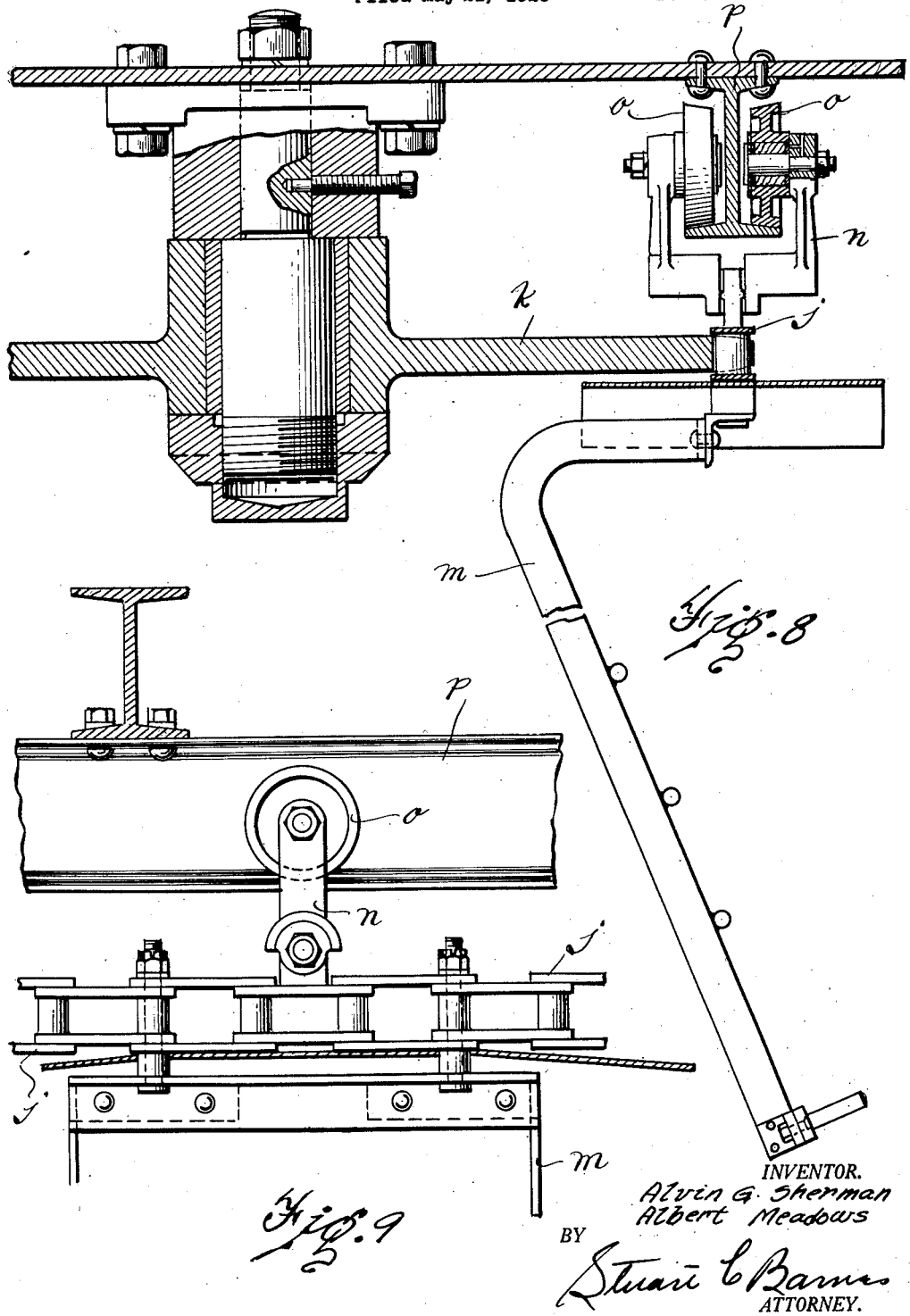

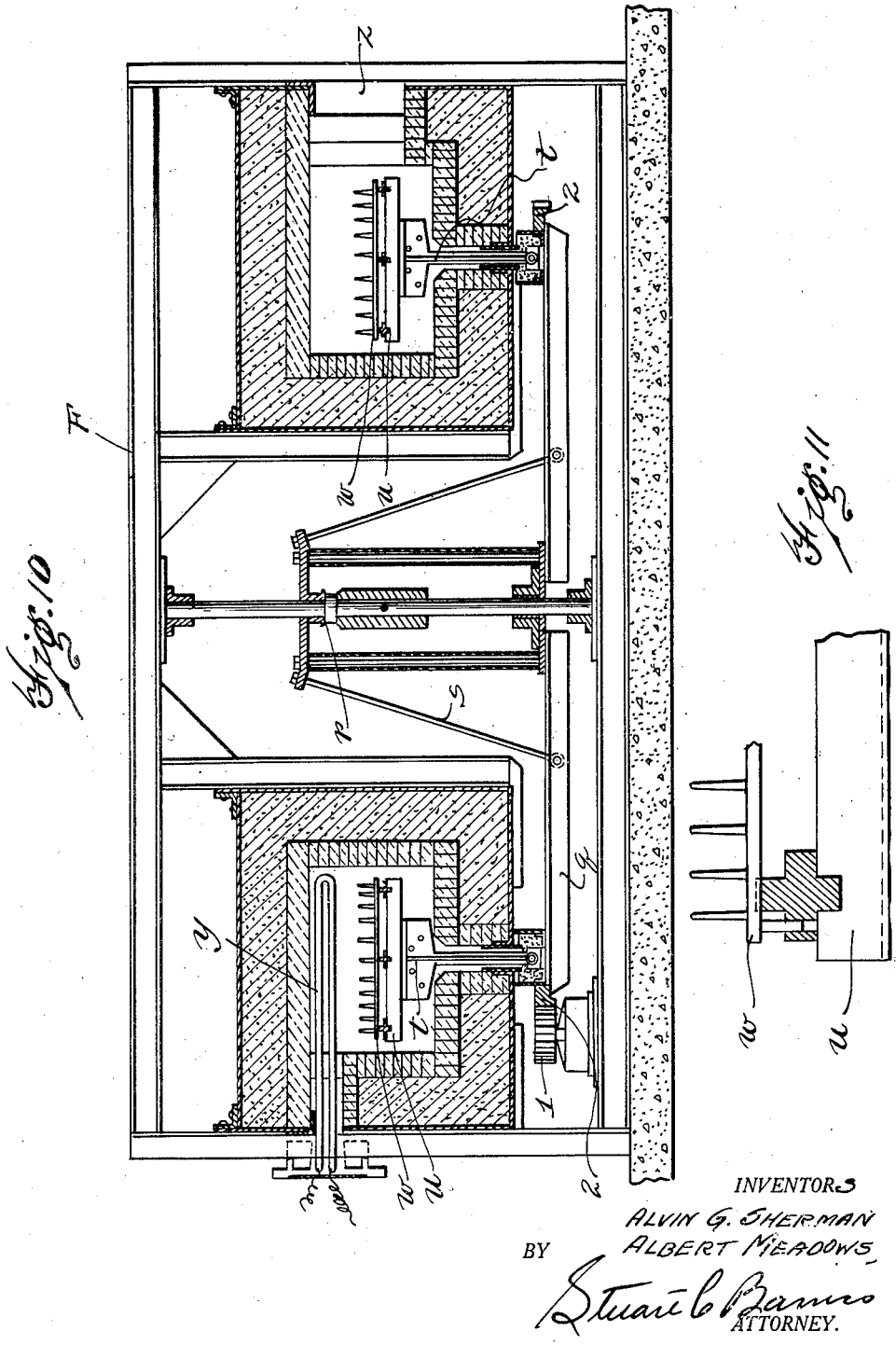

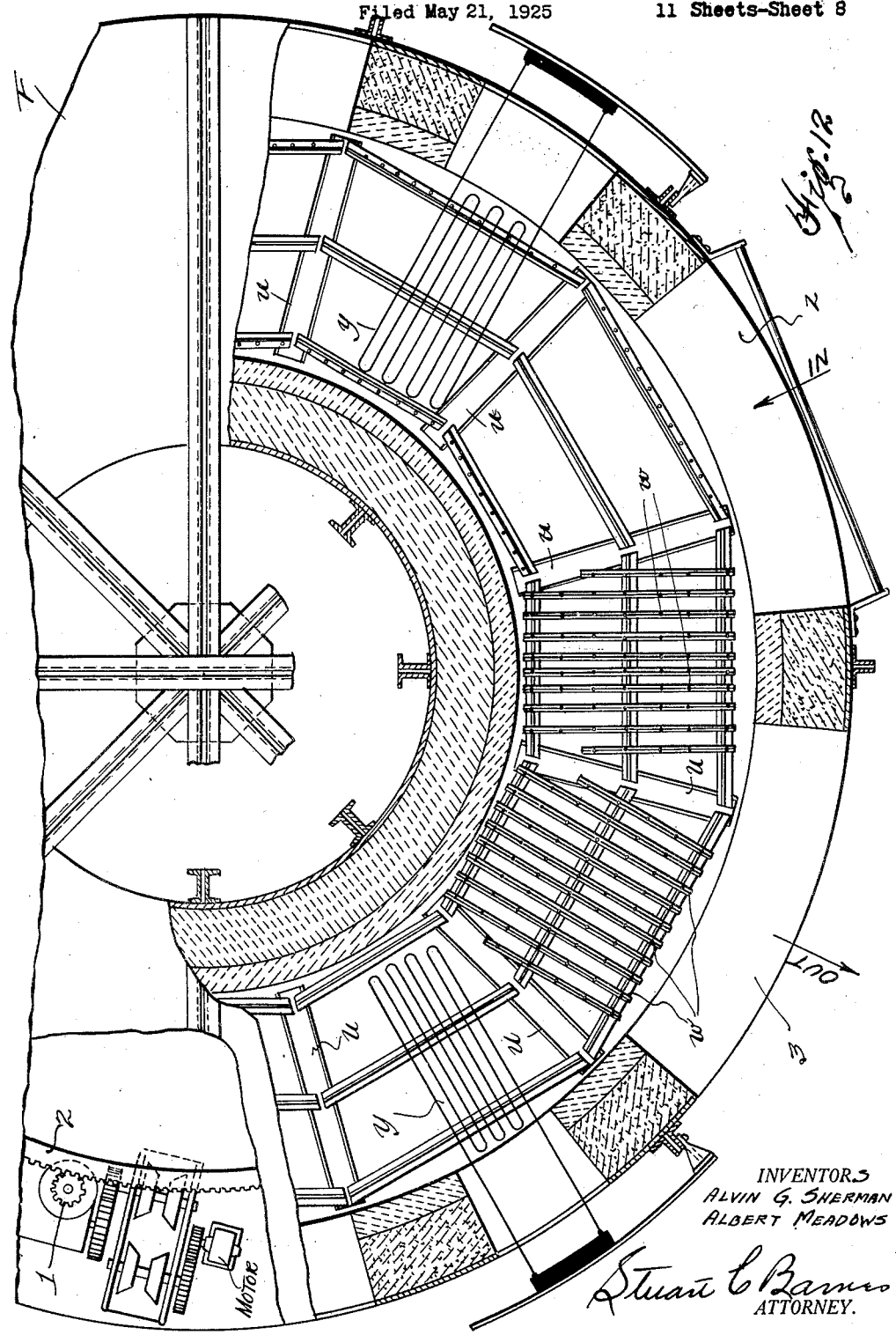

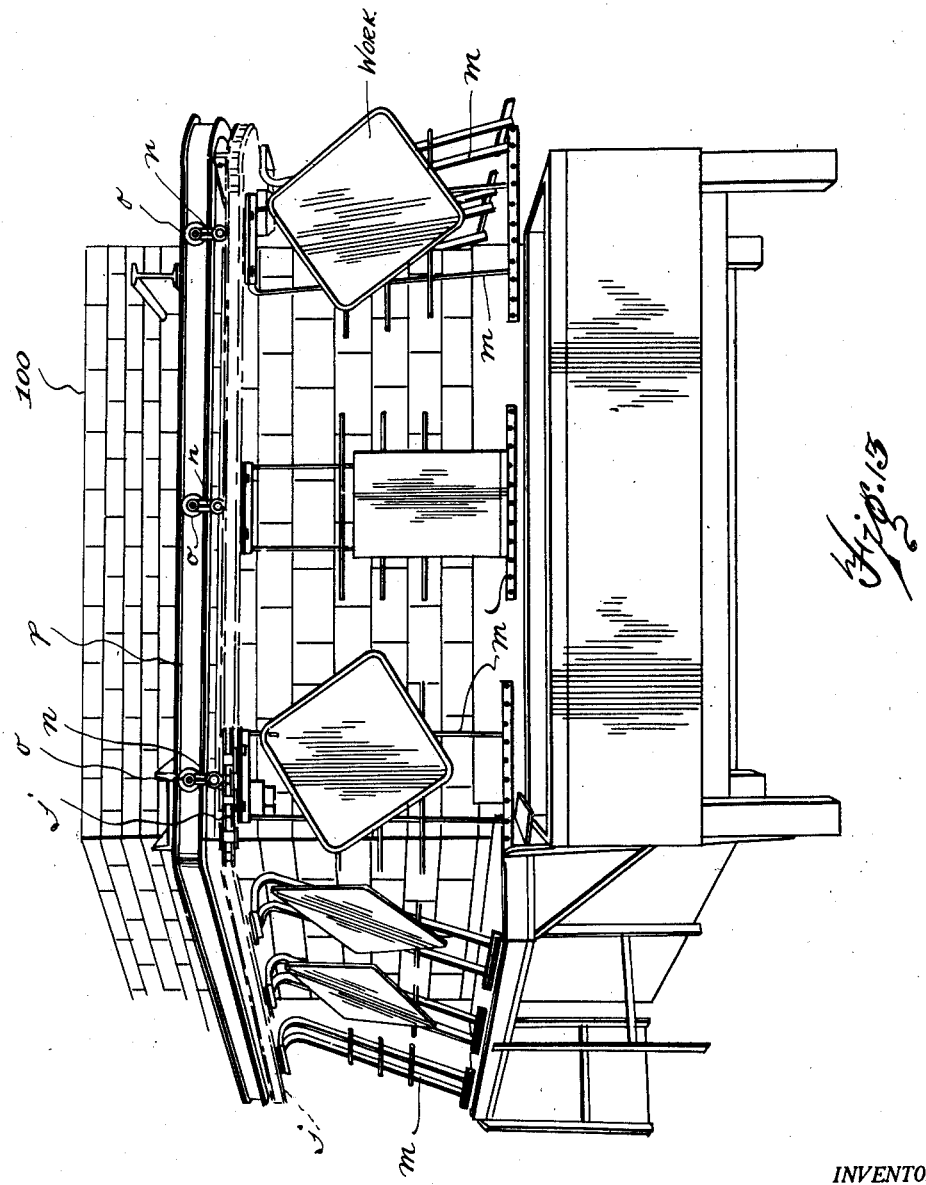

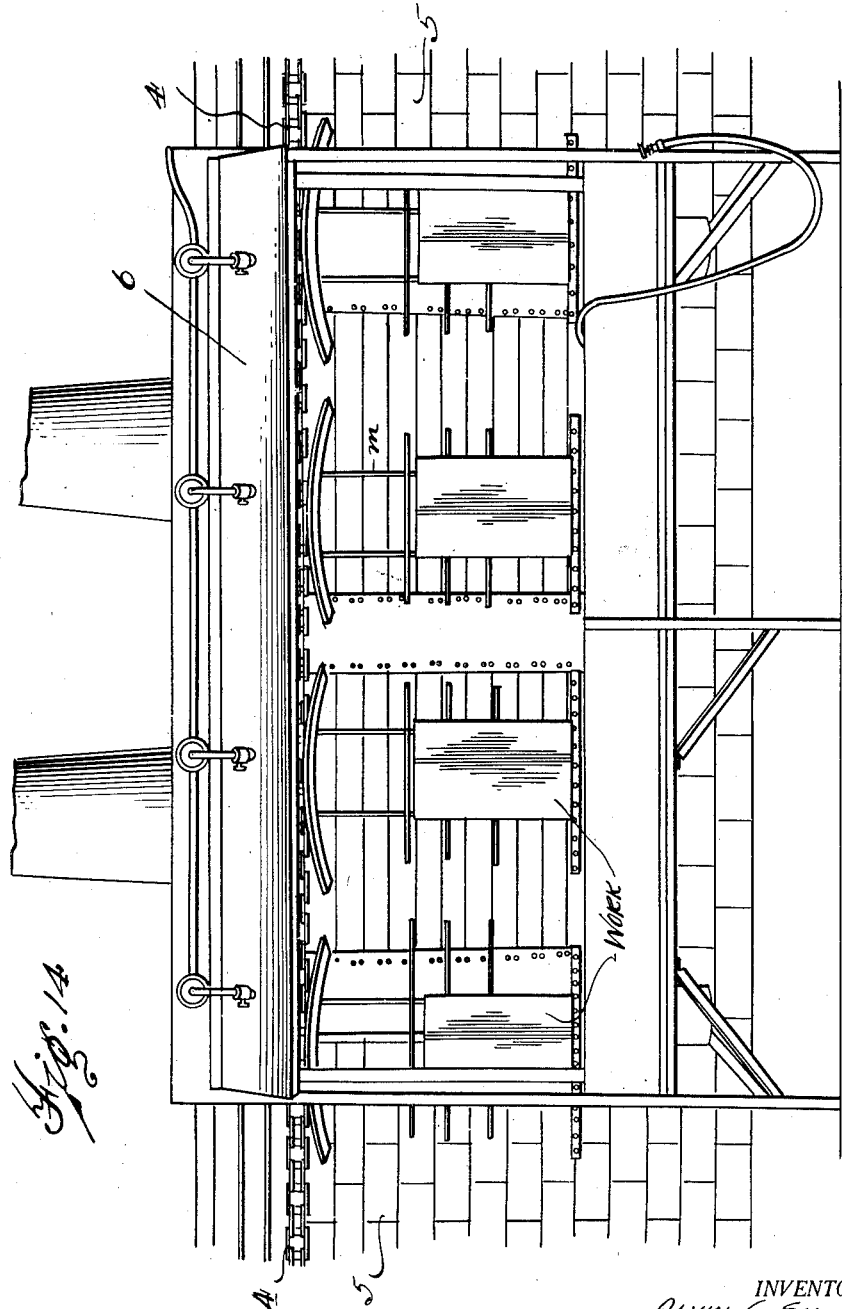

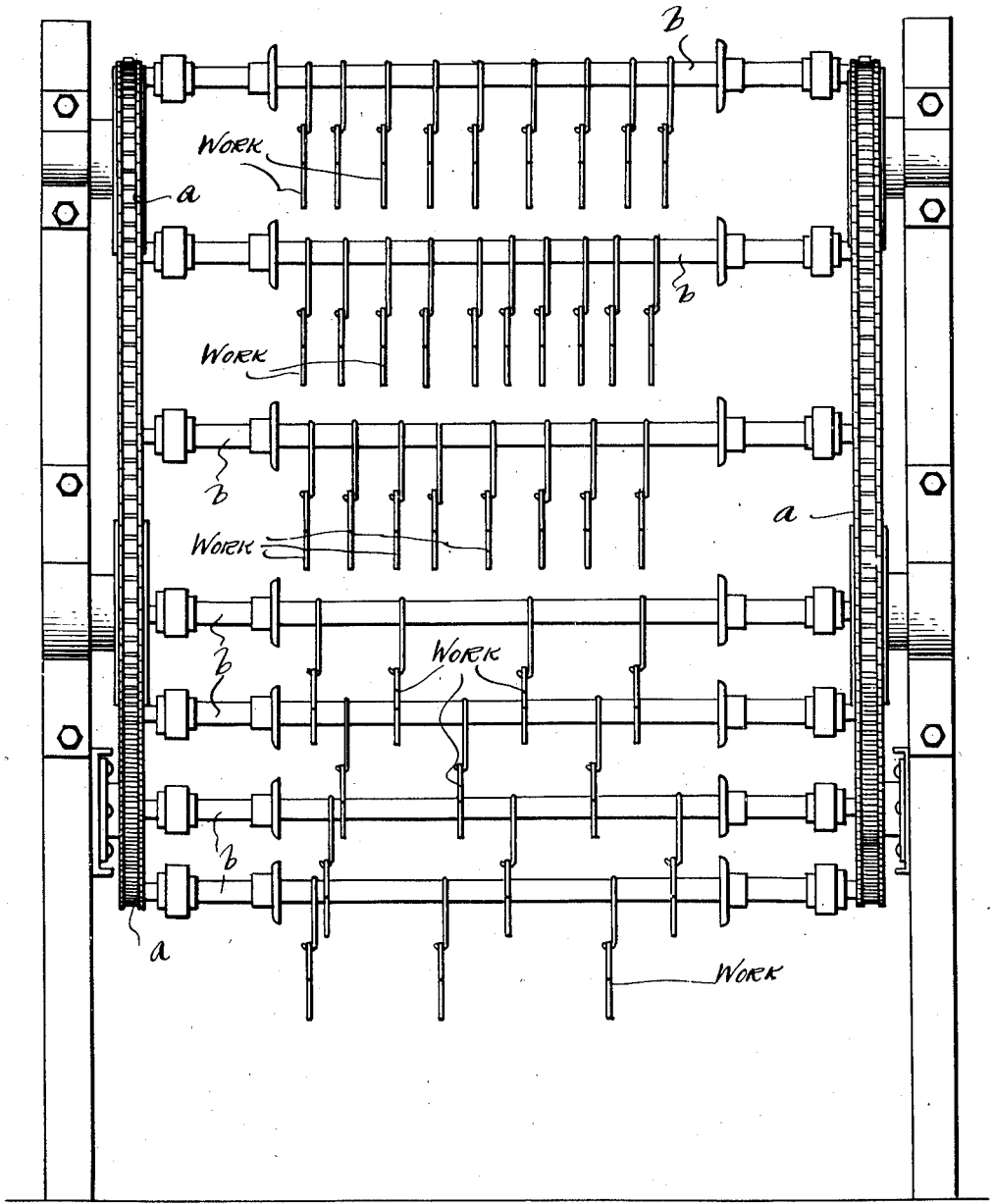

Patented Aug. 21, 1928.

1,681,440

UNITED STATES PATENT OFFICE.

ALVIN G. SHERMAN AND ALBERT MEADOWS, OF DETROIT, MICHIGAN, ASSIGNORS TO DETROIT VAPOR STOVE COMPANY, OF DETROIT, MICHIGAN, A CORPORATION OF MICHIGAN.

PROCESS FOR CONTINUOUS GLASS ENAMELING.

Application filed May 21, 1925. Serial No. 31,810.

This invention relates to a method for glass enameling or coating metal articles with porcelain. It is the object of the present method to treat the said articles to the various steps while moving in a progressive line or lines, and to accurately time each individual operation and the progression to the next operation so as to completely eliminate all storage that takes place ordinarily between operations and to improve the product by eliminating certain physical and chemical changes that take place due to work standing around idly between operations.

In accordance with present day practice, porcelain operations are usually wholly separated operations. The metal is first cleaned of grease and rust by separate dipping and pickling operations. Then in a separate department the cleaned plate is dipped and brushed with a blue and ground coat of porcelain. It is then allowed to drip, and then stored in large numbers on racks on trucks. The storage may take place for almost any length of time, there being no dependability in the action of the operators in selecting the proper truck for the next operation at the proper time. The plates are then fired in gangs in a muffle furnace which usually is not timed by any accurate mechanical device but solely by the judgment of the operator. They are then stored in the racks on trucks and transferred to the spraying department, cooling in the meantime variant lengths of time, and remaining idle different periods of time, depending upon the scrupulousness of the operators in selecting the proper truck at the proper time for the next spraying operation.

The work is then relaid on racks on trucks and again subjected to various periods of drying and idleness. It is then edged over revolving brushes (that is the white coat of enamel is taken off along the edge to prevent the enamel chipping). The work is then reloaded on to the racks and may, or may not, in its proper order be wheeled to the muffle furnace where it is again fired, then laid out again on racks to cool and the second coat of white enamel spread on, allowed to dry, edged, and finally again fired and cooled. This is the general commercial process which has been fairly satisfactory, but it has several disadvantages compared with our improved process for continuously porcelaining metal by means of controlled time factors and by a continuous progression.

It is possible not only to completely eliminate all storage of work undergoing operations, but is also possible to completely eliminate certain deleterious physical and chemical changes that take place in subjecting the work to variant time periods in any given operation and while awaiting succeeding operations. For instance, in the drying operations and especially the fusing operations, it is very desirable that the time factor in these operations be controlled to secure uniformity. This control is relieved so far as possible from human agency. Obviously in the chemical cleaning operations and especially in the fusing operation variant chemical and elemental actions take place where conditions vary.

Furthermore, we have found that if the work is allowed to remain idle for too long periods between succeeding operations that the best results are not obtained. It is not possible to exactly comprehend all the factors that produce this difference, but we believe that certain harmful chemical and physical changes take place if the time element between the operations is too long. Dust and impurities can collect on the work, if stored for an unduly long time on racks, and changes take place in moisture content, oxidation, etc. when the work is allowed to idle between coats with the raw unfixed coat unduly exposed to atmospheric conditions. In addition the work which has been dipped or sprayed with the ground or color coat will be readily injured by contact with each other when stored on racks. We find that our continuous process about to be described eliminates variant atmospheric and weather conditions that are deleterious to the product and secures a much higher grade product at a less expense and with a very much smaller plant space.

In carrying out our new improved process we find it advantageous to employ certain apparatus. But it will be understood that this apparatus is illustrated and described only as a preferably instrumentality in carrying out our continuous process or any of the substeps of the process. It will be obvious that the steps and the operation can exist wholly separate from the apparatus described and shown, and in fact could be conceivably performed with substantially no apparatus whatever, but simply with certain materials, certain forms of energy and human aid.

Reference is made to our copending case of even filing date, Serial No. 31,811, in which the apparatus is claimed.

In the drawings:

Fig. 1 and Fig. 1a are two portions of one diagrammatical view of the entire installation.

Fig. 8 is a section on the line 8—8 of Fig. 1a.

Fig. 9 is an elevational view of the parts shown in Fig. 8, taken from the right of Fig. 8.

Fig. 10 is a vertical section through one of the firing ovens.

Fig. 11 is a detail of the revolving door of the oven.

Fig. 12 is a plan view of the furnace.

Fig. 13 is a perspective view of the dipping tank showing the relation of the conveyor therewith.

Fig. 14 is a perspective view of the spray booth showing the conveyor passing therethrough.

Fig. 15 is a front elevation of the cleaning apparatus showing how the work may be loaded onto the conveyor.

Figure 1:
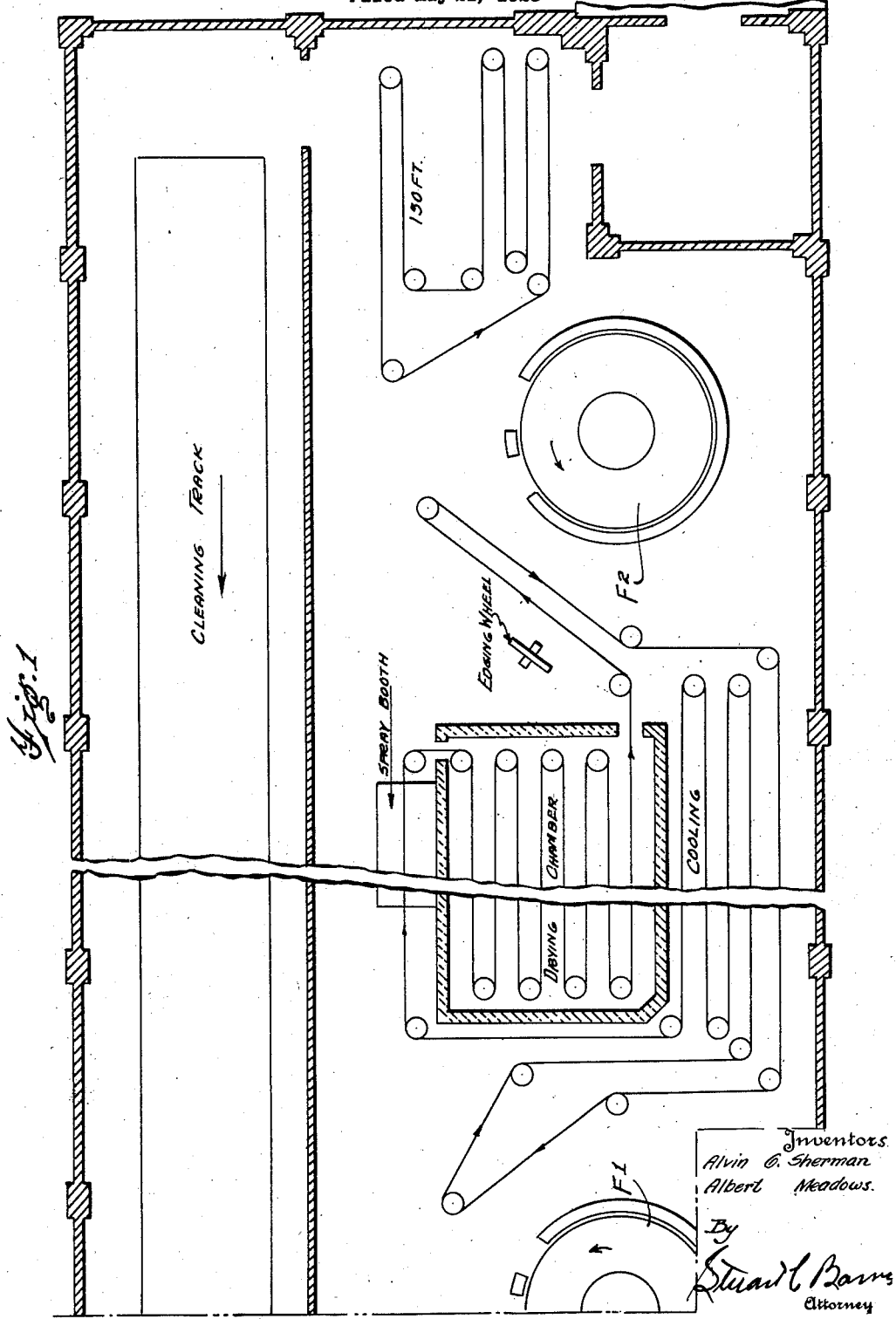
Figure 2:
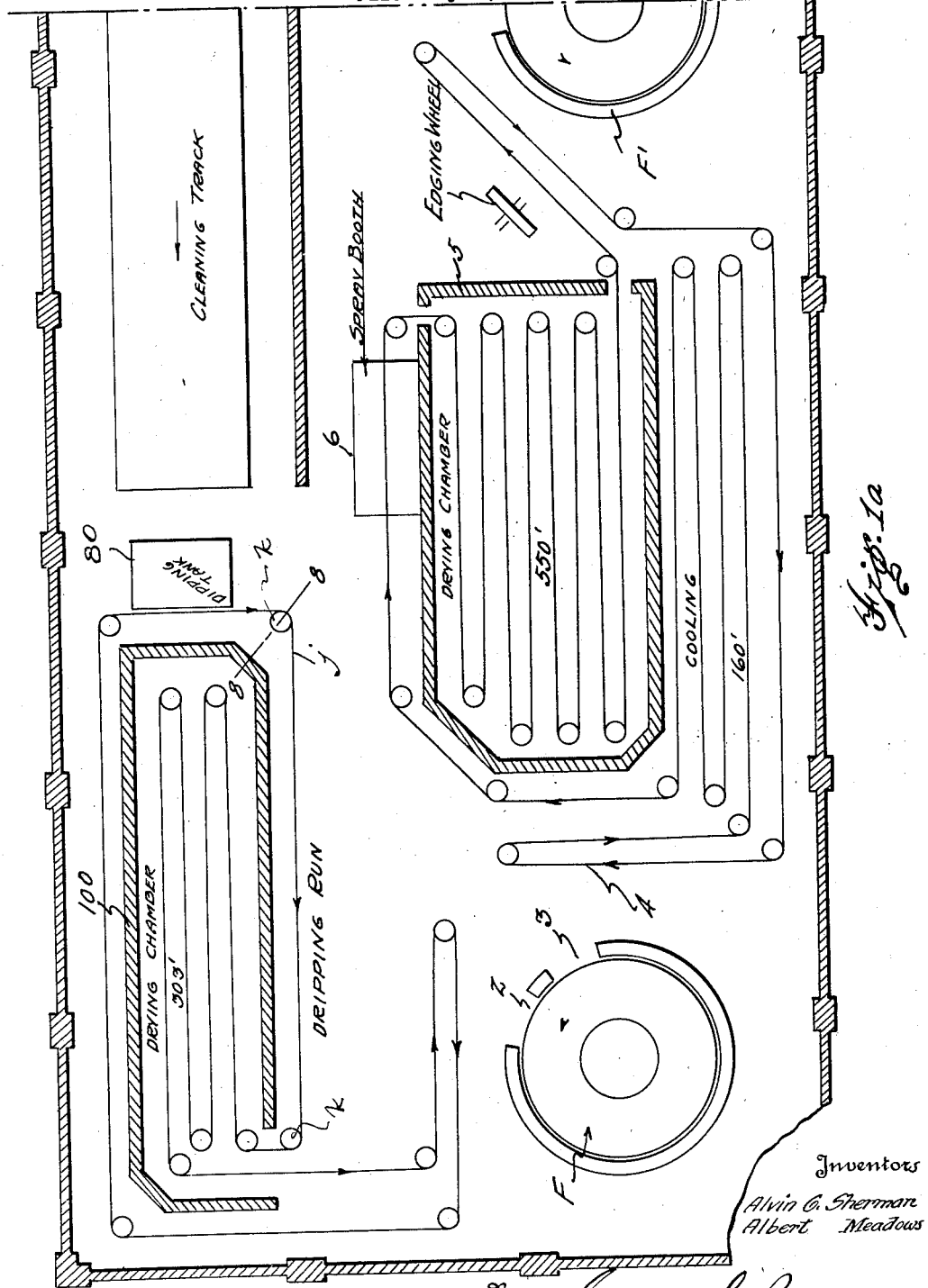
Fig. 2 is a diagrammatical side view, split up in three parts, showing the cleaning apparatus.
Figure 3:
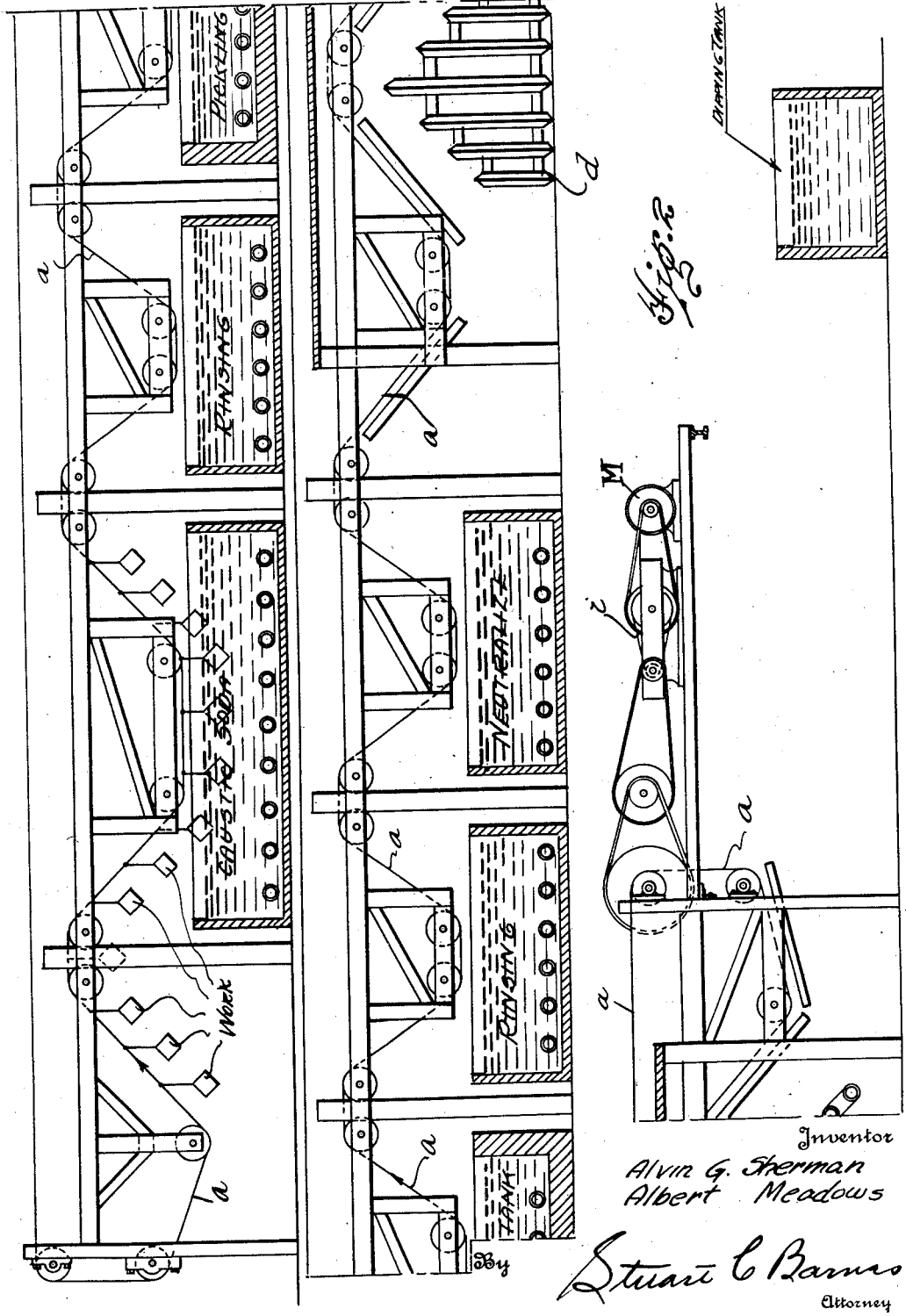
Fig. 3 is a fragmentary side elevation of the conveyor for the cleaner apparatus.
Figure 4:
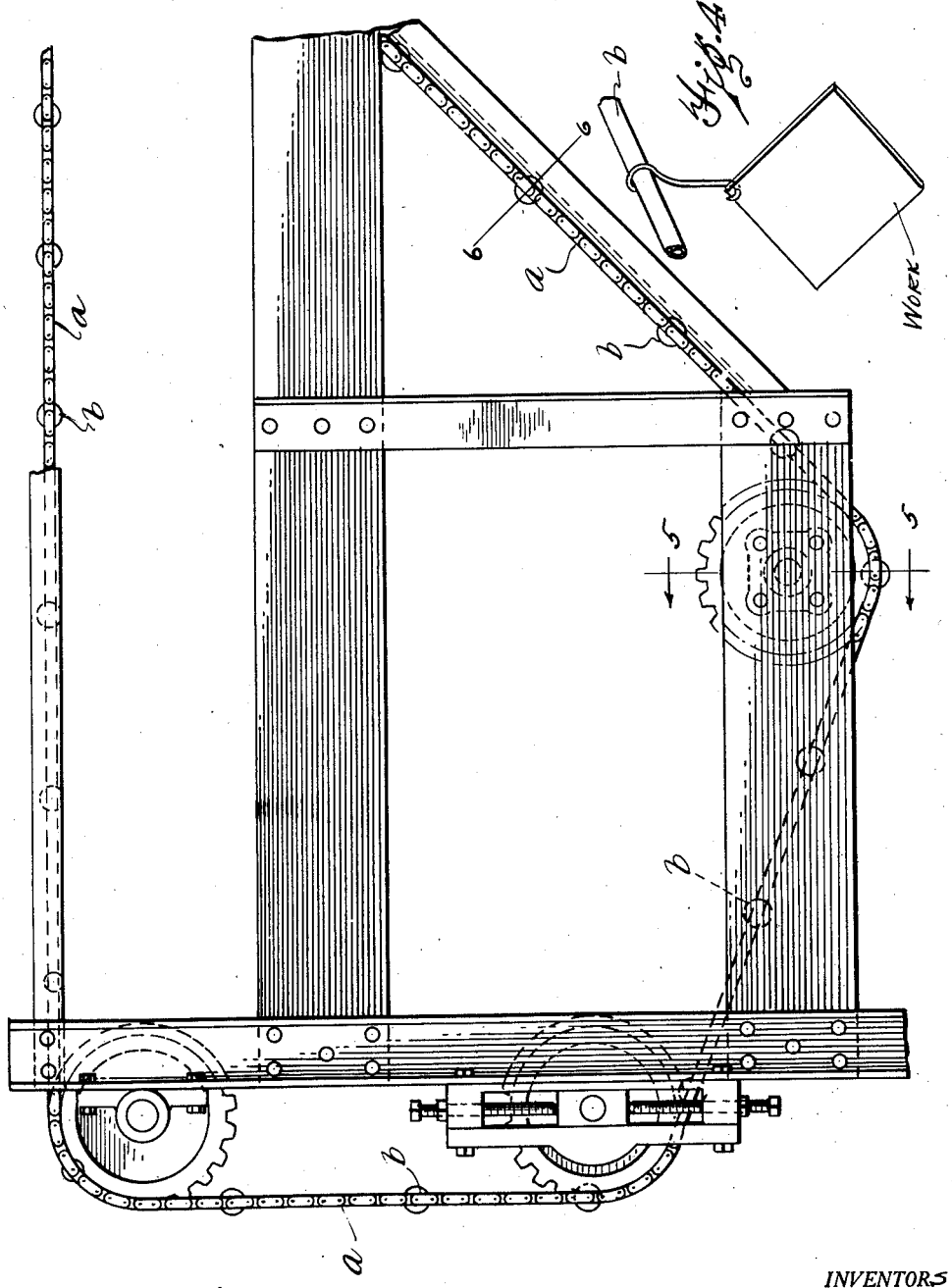
Fig. 4 is a detail in perspective of one of the conveyor rods.
Figure 5:
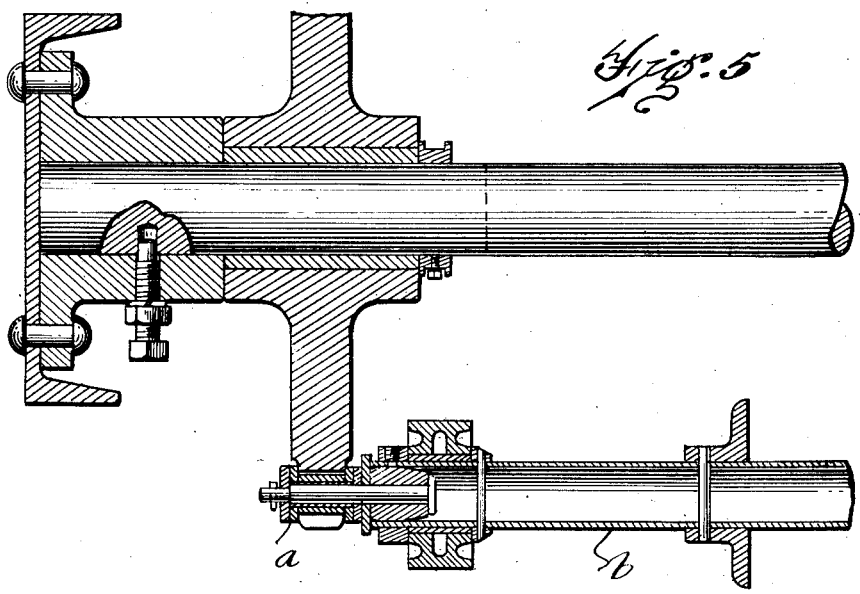
Fig. 5 is a section taken on the line 5—5 of Fig. 3.
Figure 6:
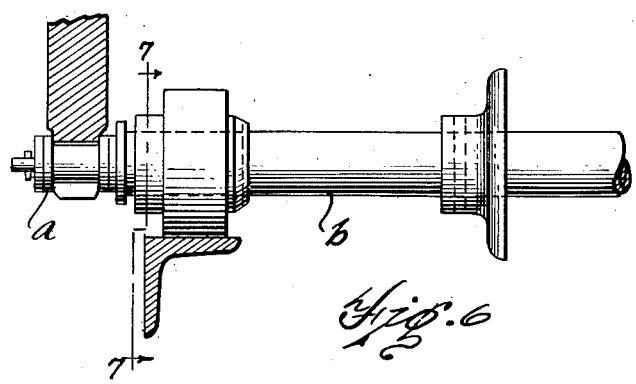
Fig. 6 is a section on the line 6—6 of Fig. 3.
Figure 7:
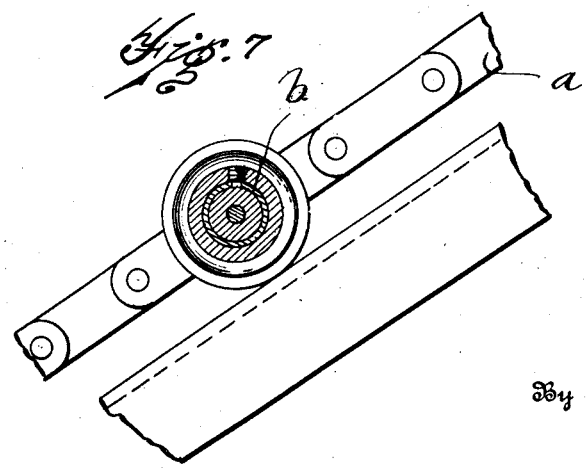
Fig. 7 is a section on the line 7—7 of Fig. 6.

It sesems best in explaining the method to describe first in detail the continuous porcelain mill which we have designed to carry out our method. Referring to Figs. 1 and 1a, which are the two parts of one large diagrammatic plan view, it will be seen that the first operation is the cleaning operation. Referring to Fig. 2, which is a composite view of the three parts of the cleaning conveyor air tanks, the work is hung on the transfer bars $b$ of the conveyor chain $a$ (see Fig. 4), preferably in about twelve lines, that is, twelve plates on each rod. This conveyor chain is driven by a suitable motor M with suitable reducing transmissions $i$. The metal plates are carried by the conveyor down into a tank containing an alkaline cleaning solution, such as caustic soda, where the grease is removed by either a chemical or solvent action; then into a rinsing tank, then into a pickling tank for removing dust and other impurities by chemical action; then into a rinsing tank and finally into a neutralizing tank of mild caustic soda. The work is then carried over the heating coils $d$ where the water is forced-dried to prepare the work immediately for the next operation.

It will be noticed from Fig. 1a that the delivery end of the cleaning tank is immediately adjacent to the dipping tank. Here the workman takes the work from the cleaning conveyor and dips it into the tank 80 which is filled with the ground coat of liquid porcelain. This is usually a viscous blue liquid of glass and other constituents, including cobalt oxide. This is a necessary coat to make the superimposed coats stick to the metal. The operator or operators must work at given speed in order to take care of the product as it is delivered from the moving cleaning conveyor. We have found it advantageous to run the work in twelve lines, through the cleaning conveyor at a speed of about one foot per minute, so as to give the work a requisite length of exposure in the several tanks. This would not be permitted if the conveyor was to run at the speed of the next succeeding conveyor. The next succeeding conveyor $j$ is termed the dripping and drying conveyer. Referring to Figs. 8 and 9, it will be seen that this conveyor comprises a chain $j$ which runs over sprockets, one of which, the sprocket $k$ is shown in Fig. 8. This chain has depending therefrom brackets or easels $m$ for supports for the work. On the top of the chain are secured yokes $n$ provided with trolley wheels $o$ which run in the channel tracks of the I-beams $p$. All the conveyors hereinafter described are preferably constructed in the same way.

It will be noticed from Fig. 1a that the conveyor passes in front of the dip tank and thence runs down the one side of the drying room 100 before it enters the same. This drying room is kept at a temperature around 200° F. The run of the conveyor outside of the room is for the purpose of permitting the drip before the ground coat is subjected to the relatively high heat of the drying oven, which is calculated to stimulate evaporation and temporarily fix the coat so it may be fused. The conveyor has several loops through the drying chamber or oven so as to give the work just the proper length of time exposure at the given heat condition to nicely prepare the work for the next operation.

It is intended to have the entire mill work a given schedule of production. The time elements which are one of the big factors of our improved process are then controlled by the speed of each conveyor or the length of the conveyor passing through any given instrumentality or by the number of work units that are crowded together on any given space of the conveyor. For instance, in the cleaning instrumentality, by running the work through in units of twelve, the conveyor can be run very much slower and hence the work exposed longer in the cleaning tanks than would be permissible in accordance with the general time schedule of the apparatus as a whole. The longer time factor in the drying chamber is secured with the conveyor running in step with the established rate of production for the entire apparatus, but by the conveyor being looped back and forth to increase the time period to the correct factor. Some of the important points in my process are the time of submersion of the plates in the cleaning tanks, the time the ground coat liquid is permitted to run before fixation starts, and the time the ground coat is exposed in the drying oven. They are all nicely fixed in the interest of absolute uniformity of product. These are not immaterial factors, for obviously if the coat of liquid porcelain is allowed to drain with the plate in an upright position too long more of the coat than desirable can flow off and there would be a non-uniformity in the thickness of the coat. Under the old conditions where the operator of the dripping tank simply sets the plates upright an the side of the drip tank there was no time factor control whatever. It might be put on the rack before the excess had properly dripped off or they might be allowed to run until too much had drained off, this depending altogether on the skill of the operator.

As to the drying operations, we believe that forced drying has never been, or at least to any extent, practiced in porcelain works. The drying has been largely an atmospheric one, variant with different weather conditions. Certainly there has never been, so far as we are informed in a process of this kind, a continuous progressive drying operation for the temporarily fixing of the coat. This progressive drying operation is not a mere conveyor proposition but it will be evident that it introduces a precise time factor into the forced drying operation so that this may be carried on for not more than the desired time and not less. This prevents chemical or physical deterioration, which we believe, takes place where the drying is not correctly timed and where there are variations in the atmosphere, both in the heat and in the humidity. Such variations are practically wholly eliminated with this forced drying.

This conveyor as shown in Fig. 1ᵃ passes immediately in front of the firing furnace F. The operator here transfers the plates into the furnace through the opening $z$. This furnace is preferably an electric furnace, such as detailed in Fig. 10. Electric heat elements $y$ of the resistance type are placed around the annular furnace chamber except adjacent the intake and the outlet openings. They are calculated to maintain the heat of the furnace in the neighborhood of 1600° F. A ring-like carrier $u$ supports the pin bars $w$ on which the work is laid. The ring-like carrier is supported on posts $t$ from a rotary suspended platform $q$. This platform is suspended by the bars $s$ from the thrust bar $r$; it is driven by a small pinion 1 meshing with the large ring gear 2. By using a continuously rotating furnace the scheduled progression can be made in the process and the time element of the furnace controlled without skilful human observation. The only human factor involved is to take each plate out as it has completed its cycle in the rotary furnace. This furnace does not have to rotate at the same rate as the conveyor chain, which latter we prefer to drive at an average speed of, say twenty feet a minute. We find that an average of two and a half minutes for the firing cycle obtains fairly good results, but this cycle can be varied in time as respects the conveyor without altering the speed of the conveyor, for, obviously, the plates can be laid on to the floor of the furnace in closer spacing than occurs between the easels on the conveyors. Hence, simply by packing the work in closer or separating the work at widely spaced intervals on the furnace floor, the capacity of the furnace is co-ordinated with the speed of the conveyor. However, it is only by altering the speed of the furnace floor that the time element of the fusing operation can be varied.

The work as it completes its cycle around the firing furnace is taken out through the opening 3 by means of a long handled fork. The operator places it on an easel of the conveyor chain 4. This conveyor loops back and forth a number of times through a travel of approximately one hundred and sixty feet to permit the dull red hot plates or work to cool. The conveyor then runs through the spray booth 6 where the second enamel coat or the first color (usually white) enamel coat is applied with one of the common forms of atomizing guns now in use. This application is made while the work is in motion. The conveyor continues on and loops back and forth through approximately five hundred and fifty feet in a second drying chamber designated 5. This serves to dry the sprayed surface before it is presented to the edging wheel and the second firing furnace. It may be advisable to wipe off the first color coat around the edges of the work before the work is carried through the drying chamber. The edging operation may be done either before or after the work passes through the drying chamber.

This edging operation which is not absolutely essential is, however, a desirable operation in connection with all porcelain work, for it is found that if the white glass enamel is allowed to reach the edges it is liable to chip off; hence it is customary to wipe the color coat off at the extreme edges. It is usually done with a revolving brush. The work with a suitable pattern cover is brought against the revolving wheel which wipes it off at the exposed portions. It may also be wiped off by hand. When the conveyor 4 passes this edging wheel as shown in Fig. 1ª, the plates have to be taken off one at a time from the easels and one or more operators are required to do the work and replace them as fast as they are taken off. Obviously suitable machinery could be employed for automatically performing the edging operation.

The work then passes on the conveyor in front of the second furnace F¹, where it is fired in the same way in the same kind of a furnace, but preferably at a slightly less temperature, say 1550° F. Again the work is placed on a cooling conveyor, thence passing through a spraying booth, drying chamber, edging wheel and a second furnace F², to apply and finish the second color coat of enamel in precisely the same way.

Finally the work is placed on a cooling conveyor of about one hundred and thirty feet which permits the dull red hot metal to gradually cool.

The above is a continuous porcelain mill in which the several instrumentalities are coordinated in capacity, speed and location to continuously handle the work from its raw state to its finished condition, and which is a valuable apparatus in that it compels a uniform time period for each particular operation, depending on the conveyor speed and conveyor travel during such operation, and also compels a uniform time interval between the several operations.

It will, therefore, be obvious that the process itself could be performed by entirely different instrumentalities or without any mechanical means, but simply with suitable chemicals, human work, heat energy and the liquid porcelain.

By, however, using a definite zone for the limits of each operation it is possible to introduce into the process definite time control factors for each operation by simply regulating the length of path each article takes through such an operative zone, or regulating the grouping or spacing of the articles through an operative zone and altering the speed through that particular zone without altering the predetermined schedule rate of production for the whole process.

The cleaning instrumentality may be broadly considered the zone of cleaning operation; the dipping, the dripping zone; following this, a firing zone; followed by a cooling zone, a spraying zone; a drying zone; an edging zone; then again a firing zone; cooling zone; spraying zone; drying zone; firing zone; cooling zone, etc.

So far as the broad aspects of our process are concerned, it matters not whether all these operations are done automatically and the transfers made from one operation automatically to the other, or not. It matters not whether these operations are done by a drying oven or a firing oven, for instance, a human controlled hot blast or a high temperature torch, provided the agency used would suitably accomplish the purpose.

A broad conception of the process resides in the establishment of a scheduled rate of production and the progression of the work through the zones where the several necessary operations are performed at speeds and distance of travel calculated to give a definite and a regulatable time factor for each operation. This time factor can be altered for any given operation by changing the distance of travel or the grouping of the work while going through such operation without in any way modifying the scheduled rate of production.

What we claim is:

1. The process of enameling metal articles adapted to be finished by one or more firing operations, which comprises continuously passing the articles through a cleaning liquid, enamel-coating the articles at a predetermined time relative to the cleaning thereof, continuously conveying the enamel-coated articles consecutively adjacent a source of radiant heat whereby to allow part of the enamel to drip off but causing setting of the enamel at the required time to temporarily fix the coat of enamel relative to the firing conditions, artificially forcing the drying of said fixed coat and continuously and consecutively presenting the dried articles to compel firing at a predetermined time after the drying operation.

2. The process of treating, enamel-coating and firing metal articles, which comprises continuously moving and consecutively subjecting the article or articles to a firing temperature, subjecting the article or articles to cleaning, coating and drying operations coordinated with the firing operation and regulating the time of and between the coordinated operations to effect the proper chemical and physical condition of the article or articles at the instant of firing.

3. The process of enameling metal articles adapted to be finished by one or more firing operations and one or more enamel coating operations, which comprises coating the articles with enamel, allowing the enamel to drip, fixing the coat of enamel at a predetermined time and then forcing the drying of the fixed coat and compelling the introduction of the articles into the firing furnace at the proper time, said forced drying being timed relative to the firing operation whereby the physical and chemical conditions of the article are uniformly correct at the instant of firing.

4. That step in the process of enameling metal articles adapted to be finished by one or more firing operations, which comprises coating the articles to be fired, supporting the articles vertically whereby to allow the excess coating material to drip off and then stopping the dripping and temporarily fixing the coat relative to the firing operation whereby the articles are to be coated with just the right amount of enamel for the particular temperature of the firing operation.

5. The process of enameling metal articles adapted to be finished by one or more firing operations, which comprises causing the articles to travel in a defined path and continuously and consecutively subjecting the articles to a cleaning operation, a dipping operation, a dripping operation, and a drying operation, each operation being timed and coordinated with the firing operation to effect the proper chemical and physical condition of the articles at the instant of firing.

6. The method of enameling metal articles adapted to be finished by one or more firing operations, which comprises subjecting the articles continuously and consecutively to a plurality of zones for applying the necessary operation for coating an article with porcelain, compelling the introduction of the article in succession in such zones, regulating the time factors for each zone and causing the article to have a uniform and predetermined rate of progression through the zone, and coordinating the traveling of the article through all the zones having varied time factors by changing the grouping through the zones having different time factors, and performing the operations on the articles while continuously traveling through said zones, said operations being coordinated with each other and with the firing operation.

7. The process of enameling metal articles adapted to be finished by one or more firing operations, which comprises continuously passing the article through a cleaning bath, coating the article with an excess of enamel, vertically supporting the article to allow the excess of enamel to drip, temporarily fixing the coat of enamel by subjecting one side of the article to a source of radiant heat and then compelling the firing of the article at a predetermined time after the fixing operation whereby the resulting article will be uniformly fired.

8. A process of enameling metal articles adapted to be finished by one or more firing operations, which comprises continuously and successively subjecting the articles to cleaning, coating and drying operations coordinated with the firing operation, compelling the firing of the articles after the drying operation at a predetermined time to insure proper physical and chemical condition at the instant of firing, and then vertically supporting the articles after the firing operation and continuously subjecting the same to cooling, spraying and firing operations coordinated with each other to effect the cooling, spraying and firing at the proper time consistent with the physical and chemical condition of the articles.

9. The process of enameling metal articles adapted to be finished by one or more firing operations, which comprises coating the articles with enamel, vertically supporting the articles and continuously moving the same to allow part of the enamel to drain off, and then temporarily fixing the enamel coat by radiant heat whereby the thickness of the enamel on the articles will be uniform when subjected to the firing operation.

10. The process of enameling metal articles adapted to be finished by one or more firing operations, which comprises coating the articles with enamel, vertically supporting the articles and continuously moving the same to allow part of the enamel to drain off, and then temporarily fixing the enamel coat by radiant heat whereby the thickness of the enamel on the articles will be uniform when subjected to the firing operation, and compelling the introduction of the articles to the firing furnace at a predetermined time after said fixing operation.

11. The process of enameling metal articles adapted to be finished by one or more firing operations, which comprises vertically suspending the metal articles and alternately and continuously passing the same through pickling and cleaning baths, enamel coating the cleaned articles at a predetermined time after cleaning, temporarily fixing the enamel coat on the articles at a predetermined time after coating and coordinated with the firing operation, and compelling the introduction of the fixed enamel coated articles into the firing furnace at a predetermined time after the cleaning, coating and fixing operations whereby the articles will have the proper chemical and physical condition at the time of firing.

In testimony whereof we have affixed our signatures.

ALVIN G. SHERMAN.
ALBERT MEADOWS.